US006290150B1

(12) United States Patent
Jones

(10) Patent No.: US 6,290,150 B1
(45) Date of Patent: *Sep. 18, 2001

(54) BARK DUST UNLOADING SYSTEM

(76) Inventor: Dudley W. Jones, 22601 NW. Dairy Creek Rd., North Plains, OR (US) 97133

( * ) Notice: Subject to any disclaimer, the term of this patent is extended or adjusted under 35 U.S.C. 154(b) by 0 days.

This patent is subject to a terminal disclaimer.

(21) Appl. No.: 09/543,132

(22) Filed: Apr. 5, 2000

Related U.S. Application Data

(63) Continuation-in-part of application No. 09/438,472, filed on Nov. 11, 1999, now Pat. No. 6,131,830.

(51) Int. Cl.[7] .................................................. A01C 15/04
(52) U.S. Cl. ............................ 239/654; 239/676; 239/678
(58) Field of Search ..................................... 239/654, 676, 239/675, 680, 678; 406/32, 39, 48, 56, 65, 79, 164; 222/252; 414/523, 526

(56) References Cited

U.S. PATENT DOCUMENTS

| | | |
|---|---|---|
| 4,219,966 | 9/1980 | McCalister . |
| 4,793,742 | 12/1988 | Strand . |
| 5,125,583 | 6/1992 | Strand . |
| 5,181,804 | 1/1993 | Wysong . |
| 5,361,711 | 11/1994 | Beyeri . |
| 5,556,237 | 9/1996 | Rexius . |
| 5,590,984 | * 1/1997 | Assarsson ............................ 406/32 |
| 5,795,108 | * 8/1998 | Lightle ................................. 406/48 |
| 6,036,406 | 3/2000 | Rexius . |
| 6,131,830 | * 10/2000 | Jones .................................. 239/654 |

* cited by examiner

Primary Examiner—David A. Scherbel
Assistant Examiner—Dinh Q. Nguyen
(74) Attorney, Agent, or Firm—Robert L. Harrington

(57) ABSTRACT

A bark dust unloading system has a mechanism for moving material in a container to an opening at the rear of the container. An auger assembly in combination with rotating rake assemblies move the material from the sides of the container to the opening. A blower assembly provides an air stream to transport the material deposited in the opening through a hose. The hose is used to distribute the material. An automatic control controls the operation of the unloading system including the movement of the material, the blower system, the augers and rake assemblies. A remote control allows the operator to alter the operations while directing placement of the bark dust. This provides for operation by a single operator.

6 Claims, 4 Drawing Sheets

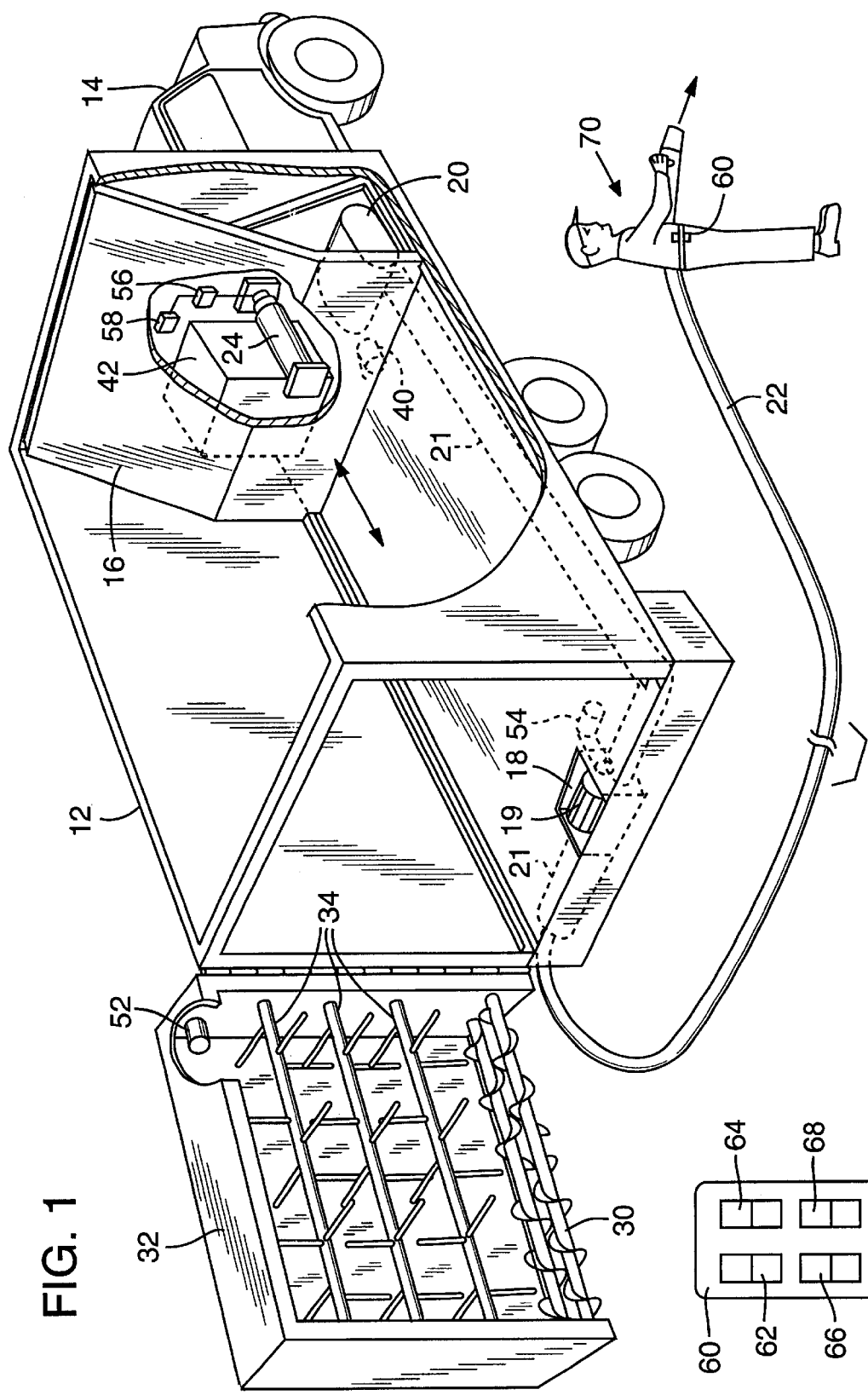

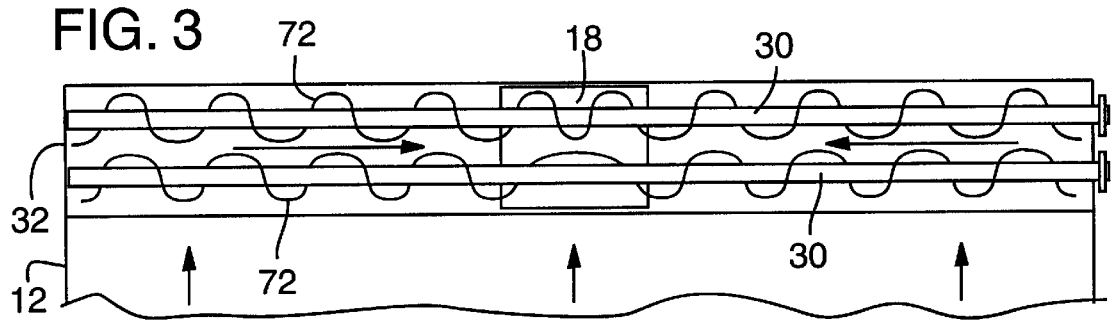
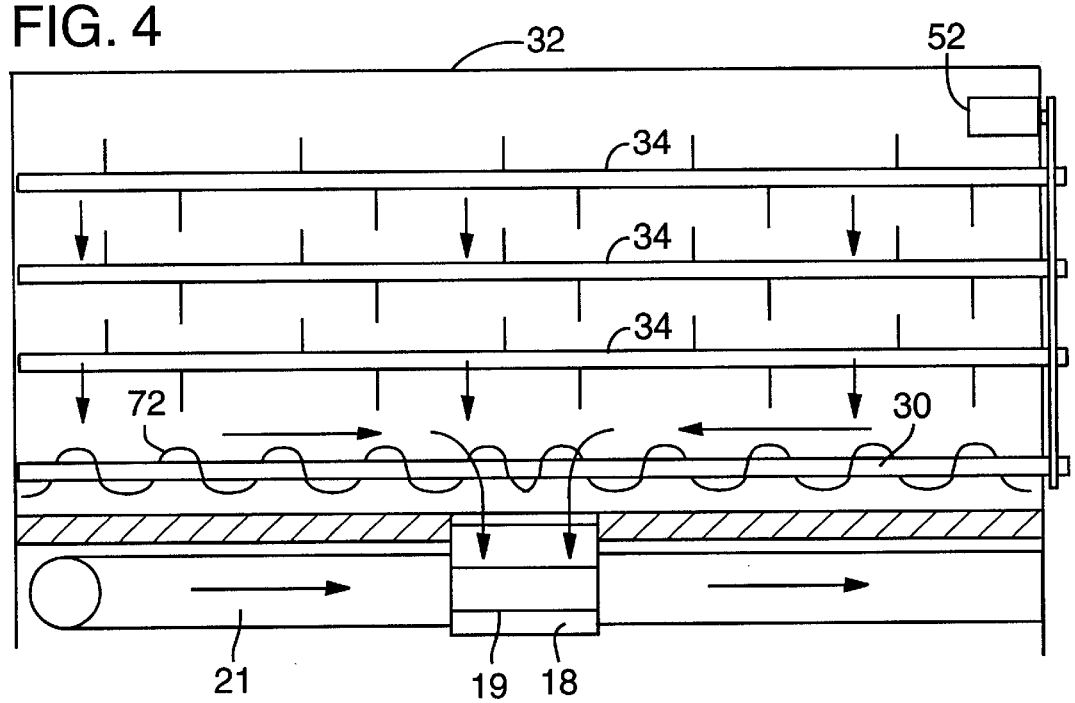
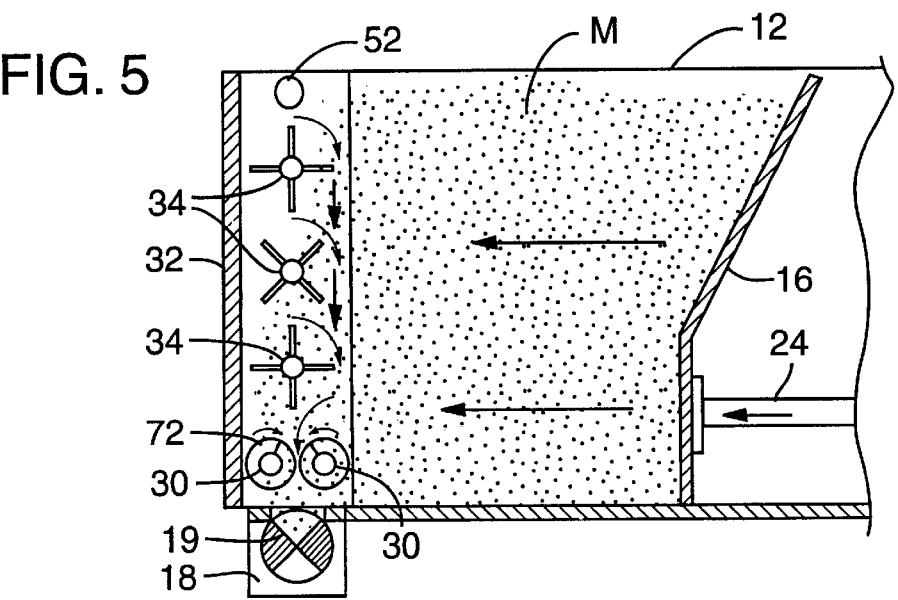

BARK DUST UNLOADING SYSTEM

This is a continuation-in-part of Patent Application titled BARK DUST UNLOADING SYSTEM, U.S. Ser. No. 09/438,472, filed Nov. 11, 1999 now U.S. Pat. No. 6,131,830.

FIELD OF THE INVENTION

This invention relates to the unloading and distribution of material, e.g., used as ground cover and including bark chips, mulch and the like, from a container, e.g., a truck box, from which the material is fed to a blower which projects the material through a hose, the distal end of which is manipulated to controllably direct the material over a ground cover area. More particularly, it relates to the manner of feeding the material from the container into the distribution apparatus.

BACKGROUND OF THE INVENTION

The use of bark dust and chips, mulch and other material as ground cover is common and is hereafter sometimes collectively referred to as bark dust or chips. Such materials are purchased by the truck load and spread under trees, around bushes and so on. A method of distribution has been developed wherein a blower system is installed on the back of a bark hauling truck. A feeder bin at the back end overlies a blower tube to which a flexible hose is attached. The bark dust/chips are pushed into the feeder bin and then fed into the air stream of the tube and into and through the hose. An operator directs the distal end of the hose for depositing the material into the desired area. The hose is sufficiently long to enable such distribution of the bark dust/chips substantial distances from the truck, e.g., into a back yard of a residence with the truck sitting in a driveway at the front of the house.

In the prior art, it takes two operators to handle this process. One operator manipulates the discharging end of the hose. The other operator oversees the process of depositing the bark chips into the feeder bin at the end of the truck box. A moving front wall is used to push the material toward the back of the truck box/container but operation of the wall needs to be monitored and controlled as well as monitoring of the material flow into and through the feeder bin, e.g., to unplug the feeder bin inlet should clumps of the material bridge over the inlet and close off flow into the feeder bin.

BRIEF DESCRIPTION OF THE INVENTION

It is an object of the present invention to obviate the need for the second operator (monitoring flow of the material into the feeder bin). To accomplish this objective, the process of feeding material into the feeder bin needs to be automatic and should anticipate and correct the common problems of feeding too fast or too slow and bridging of the materials across the feeder bin inlet.

In the preferred embodiment, the bridging problem is satisfied by enlarging the opening into the feeder bin and providing a double screw or auger inlet feed for directing flow into the feeder bin. The double screws or auger provide the function of moving material from the sides of the box to the opening into the feeder bin and they cooperatively break up and force material through the system that heretofore caused bridging. This feature will be more clearly understood upon reference to the detailed description.

Controlled feeding is achieved by automating the movement or feeding of the material from the front to the rear of the container, e.g., in response to a detection mechanism or control. In the preferred embodiment, the detection mechanism is a pressure sensing device that senses resistance to movement of the material. Through trial and error as concerns the different materials being distributed, it is known what pressures are too low so as to require the movement to commence and what pressures are too high so as to require the pushing movement to stop for optimum feeding of material into and through the feeder bin. These pressures are entered into a control that starts and stops the movement of material accordingly.

The feeding process from the front to the rear of the truck is preferably accomplished by a moving front wall or alternatively a moving floor, either one or a combination thereof being responsive to the above-mentioned detection mechanism.

The sole operator also has adjustability capabilities so that if he is experiencing too fast or too slow feeding, he can adjust the pressure settings. There are many variations of such controls even as relates to a pressure control as briefly described. Again, such will become apparent upon reference to the following detailed description and drawings referred to therein.

BRIEF DESCRIPTION OF THE DRAWINGS

FIG. 1 is a view of a bark unloading system of the present invention;

FIG. 2 is a view of a remote control for controlling the bark distribution system of FIG. 1;

FIGS. 3–5 are schematic views illustrating the movement of materials through the system of FIG. 1 utilizing a moving front wall.

DESCRIPTION OF THE PREFERRED EMBODIMENT

Figure 6:
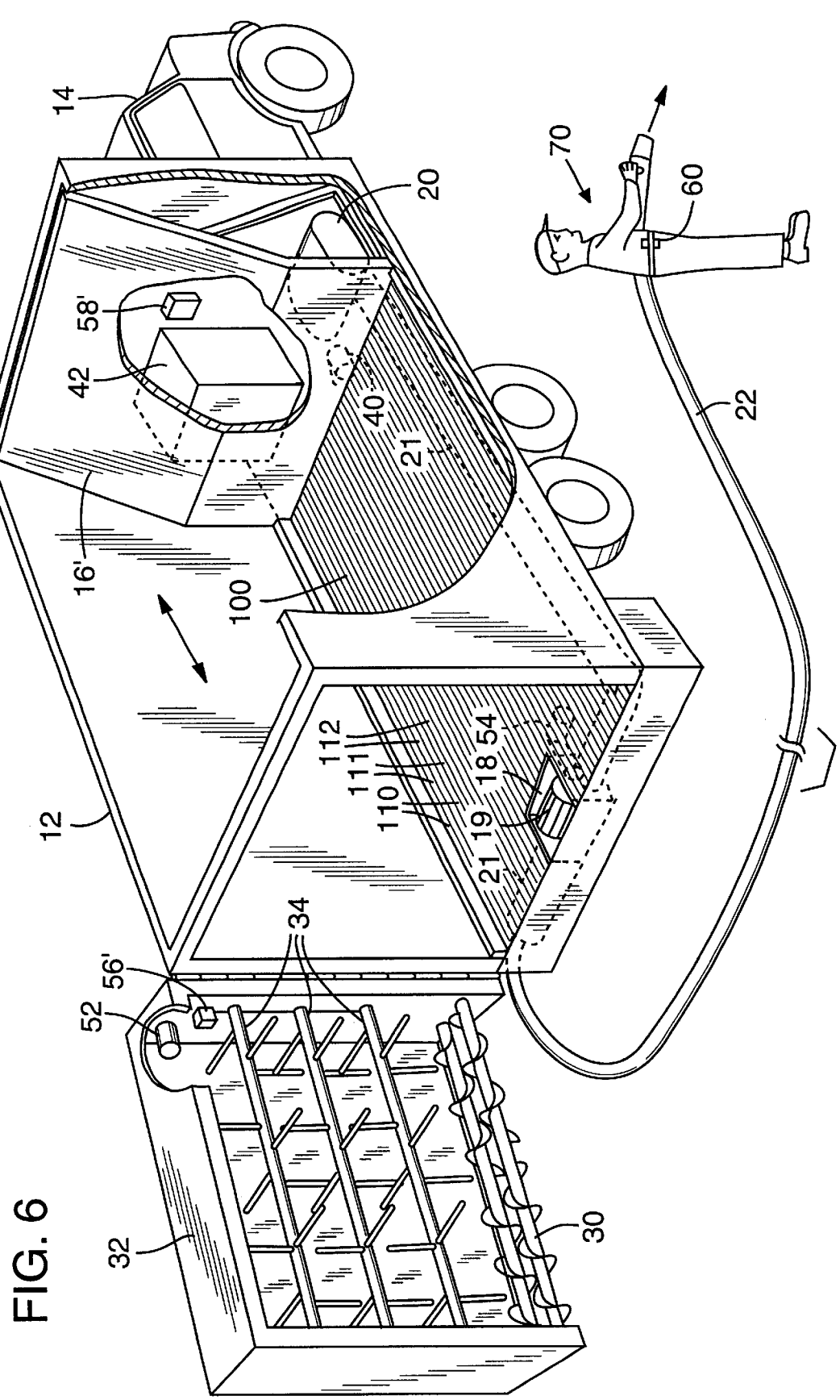
FIGS. 6, 7, 8A and 8B illustrate the movement of materials, front to back, utilizing a moving floor.

FIG. 1 illustrates a bark dust unloading system of the present invention. The system includes a mobile container 12 and in this embodiment the container 12 is a box mounted to the chassis of a vehicle such as a truck 14. The container 12 includes a distribution system that will unload and distribute material such as bark dust that is contained within the container 12. Basically a movable wall 16 is provided to move the material toward an open feeder bin 18. A known rotating baffle gate 19 is provided in the feeder bin 18 and moves the material through the feeder bin. The feeder bin 18 is coupled to an air conduit 21 which directs air flow from a blower system 20. The air flow transports the material received from the feeder bin 18 outwardly through a hose 22. The movable wall 16 is movable in the container 12 toward and away from the feeder bin 18 by a cylinder 24. An auger assembly 30 (double screw-type augers) is mounted on the rear door (end gate 32). The auger assembly 30 is arranged to move the material from the sides of the container 12 toward the open feeder bin 18. Mounted above the auger assembly 30 on the end gate 32 are multiple rotatable rake assemblies 34. The rake assemblies 34 loosens and directs the bark dust downwardly toward the auger assembly as the movable wall moves the material into the rake assemblies.

Motive power is provided to the components of the container 12 by a hydraulic pump 40 that is coupled to the transmission of the vehicle 14. A hydraulic reservoir 42 is mounted at the forward end of the container 12 in front of the movable wall 16. The blower assembly 20 and the hydraulic cylinder 24 are also mounted in the forward portion of the container 12.

A drive motor 52 drives the augers 30 and the rake assemblies 34. The rotating baffle 19 of the feeder bin 18 is rotatably driven by a drive motor 54.

A pressure sensing device 56 is coupled to the cylinder 24. The pressure sensing device 56 is adjustable by a control 58. The pressure applied against the wall 16 may thus be adjusted by the control 58 to vary the pressure applied by the wall against the material. The different materials received in the container will vary in their resistance to such movement and will require different pressure settings to properly direct the movement of the wall 16 and thus the rate at which material is delivered to the feeder bin 18.

A remote control 60 is also provided to control the operation of the bark dust unloading system. The remote control 60 has a switch 62 for controlling the speed of the blower to thus control the flow of the air through the open feeder bin 18 and the hose 22. Another switch 64 is provided to control the rotational speed of the rotating baffle 19 of the feeder bin 18. A switch 66 is provided as a pause and resume control that pauses the entire system. Switch 68 is an auxiliary switch in the control 60 and could, for example, be provided to operate the pressure control unit 58 to vary the pressure applied to the wall 16.

Refer to FIGS. 3,4 and 5 which schematically illustrate the feeding of bark dust and chips, and the like, (reference letter M) into the feeder bin 18. As this material is pushed toward the rear end of the container 12, the material M is first engaged by the rotating fingers or tines of the rake assemblies 34 which loosens the material from a somewhat compressed or compacted condition and directs the loosened material downward toward the augers 30 (FIGS. 4 and 5). The augers 30 are of the screw type with the flutes 72 being oppositely directed (one side versus the other side—See FIG. 4) and the pair of augers 30 being oppositely and inwardly directed (the inner auger versus the outer auger—see FIG. 5). Thus, material that is deposited onto the augers is directed from the sides toward the center and then downwardly into the feeder bin. This material flow is illustrated by arrows. Material that is not broken down into sufficiently small pieces will be crushed between the augers and the likelihood of bridging across the feeder bin opening is substantially reduced if not eliminated.

The arrangement of bark dust unloading system permits a single operator to unload and distribute the material M received in the container 12. With reference to FIG. 1, the operator connects the hose 22 to the air conduit 21. The hydraulic pump 40 is engaged and is rotatably driven by the transmission of the vehicle 14. The control 58 is typically preset to accommodate the particular material being delivered. The rate of the blower system 20 is also controlled to control the rate of air flow through the air conduit 21, the feeder bin 18 and the hose 22.

In operation, the material is dislodged by the rake assemblies 34 and then fed by the augers 30 into the feeder bin 18 and out the hose 22. As the material is thus dispensed, the resistance to wall movement is reduced and the wall 16 will then move toward the end gate 32. When sufficient pressure is again built up, i.e., resistance to movement, the wall will stop to allow the feeding process to catch up.

The operator may vary the pressure applied by the wall 16 to control the rate of movement of the wall 16 which controls the rate of material being dispensed through the opening 18. However, the preset controls automatically apply the preset pressure considered to be desirable for the material being dispensed and the operator may not have to make any alterations or minimal alterations. If desired, the operator may also start or stop the movement of the wall 16 at any time. The operation is thus capable of automatic operation but with the operator having full control of the dispensing procedure.

Refer now to FIG. 6 which illustrates an alternate embodiment for moving material M received in the container 12 to the rear of the container 12 and thus into feeder bin 18. In place of the movable wall 16, the container 12 has a movable floor (deck) 100 that is arranged to systematically move the material M received thereon to the opening 18. Front wall 16' remains fixed.

Figure 7:
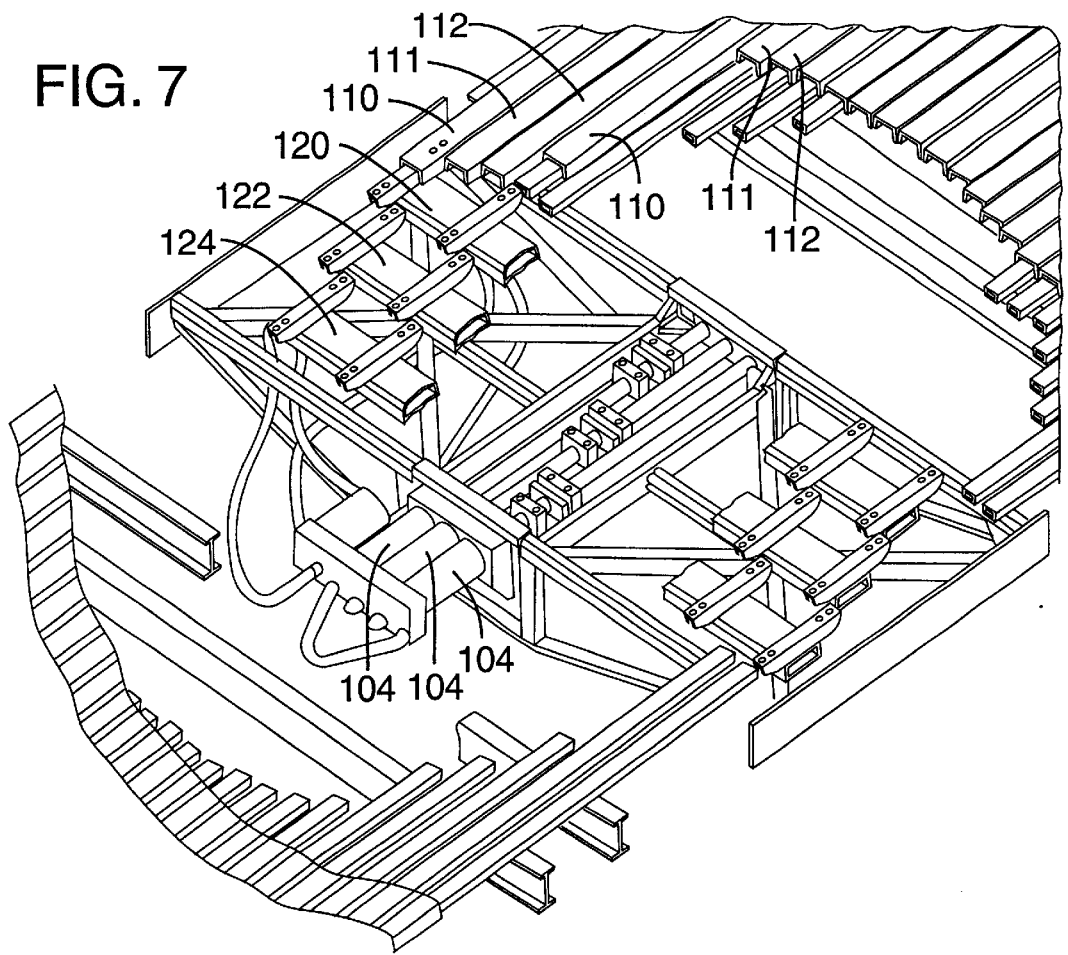

Referring also to FIG. 7, the floor 100 has multiple slats 110, 111 and 112 that are repeated in sequence across the width of the bin. Each slat designated as 110 is coupled to the other slats 110 by a coupling beam 120. Each slat designated as 111 is coupled to the other slats 111 by a coupling beam 122 and each slat designated as 112 is coupled to the other slats 112 by a coupling beam 124. A motor is provided for each of the coupled sets of slats in the form of a hydraulic cylinder 104' provided for the coupled slats 110, hydraulic cylinder 104" is provided for the coupled slats 111 and hydraulic cylinder 104''' is provided for the coupled slats 112.

A valve unit 106 is provided to control the operation of the cylinders 104. The cylinders 104 are controlled for operation in unison for rearward movement and for operation independently in forward movement. As will be explained, the alternating rearward movement in unison and forward movement independently produces material movement rearwardly. The rate of movement is controlled similar to that of moving wall 16, e.g., with a pressure sensing device 56' sensing material compression at end gate 32 and an adjustment control 58' responsive to device 56'.

Referring now to the process of material movement, in this embodiment wall 16 is fixed and simply provides a space for the equipment as previously described. The material received on the slats (designated as 110, 111 and 112) is moved toward the feeder bin 18 by controllably moving the slats back and forth a limited distance through the operation of the cylinders 104.

Figure 8A:
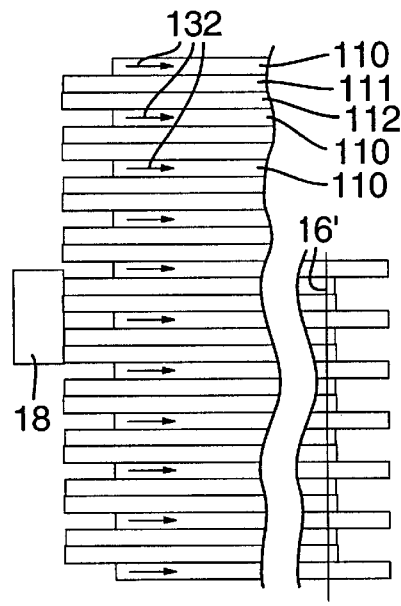
Figure 8B:
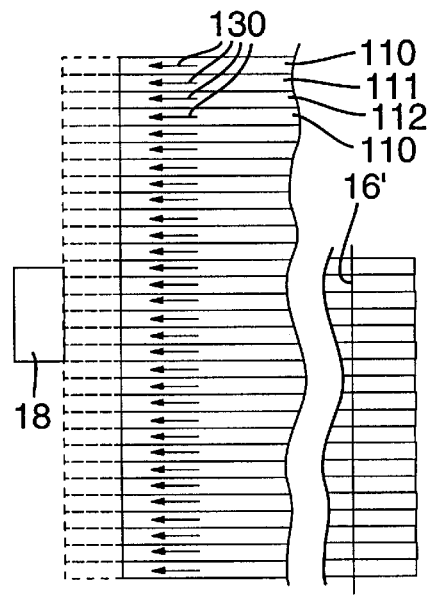

The material is moved toward the bin 18 by moving all of the slats 110, 111, and 112 in unison (a limited distance as permitted by motors 104) toward the bin 18 as illustrated by the arrows 130 in FIG. 8B. The material carried by the floor is accordingly moved with the slats. When the cylinders 104 have reached the end of their stroke, that is the slats 110, 111, and 112 have been moved to their maximum stroke, one set of slats is then retracted forward, i.e., toward the wall 16. For example, FIG. 8A shows the slats 110 being retracted toward the wall 16 (designated by arrows 132) while the slots 111 and 112 remain in position. The two sets of slats 111 and 112 being stationary retains the material as the slats 110 are retracted relative to the material. The other two sets (111 and 112) are then sequentially moved toward the wall 16 to reposition all of the slats and the material has accordingly been moved rearward relative to the floor in total. The process is repeated until all of the material has been moved to the rear of the bin where the material is engaged by the rake assembly 34 and auger assembly 30. The sensor 56' senses the compaction and through control 58' the rate of movement is controlled. The material is accordingly moved to the bin 18 where it is dispensed out through the tube 22. Control 58' is pre-set as previously described and can be manually overridden by remote control 60 also as previously described.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A ground cover distribution system for distributing ground cover material comprising:

a mobile container for containing the material;

a distribution mechanism positioned at a rear end of said mobile container;

said container having vertical side walls and a floor extended between said vertical side walls and defining a floor width and a floor length that fully supports material contained in said container, said floor throughout said defined width and length being movable for moving material supported on said floor toward said rear end;

said distribution mechanism including an opening in the container at said rear end and a hose in communication with said opening for receiving material and a conveyor mechanism interposed between the opening and the hose that conveys material received from the container and directed through said opening into and through the hose to be deposited as ground cover; and an automatic control controlling the movement of the mechanism, said control having detection capability detecting the presence of material accessible for deposit into the opening and responding thereto for alternately starting and stopping the mechanism.

2. A ground cover distribution system as defined in claim 1 wherein the distribution mechanism includes a double auger assembly extended laterally the width of the floor and adjacent the floor for directing material from the sides of the container to the opening, and further for cooperatively reducing and feeding the material into the opening between the augers.

3. A ground cover distribution system as defined in claim 1 wherein the detection capability of the control is provided by a pressure sensor that detects the presence of the material at the opening and including high and low pressure settings thereof to determine the stop and start movement of the material toward the opening.

4. A ground cover distribution system as defined in claim 1 including a remote control coupled to said automatic control to modify the settings and provide operator control of the material movement.

5. A ground cover distribution system as defined in claim 1 wherein the movable floor comprises:

a plurality of elongated slats aligned in the direction of movement in side-by-side relationship and arranged in repeating sequence of at least first, second and third slats, said slats independently movable along the elongated length a limited distance, each of the first slats tied together, each of the second slats tied together and each of the third slats tied together and a motor for each of said first slats, second slats and third slats, and a control for selective actuation of said motors for moving the first, second and third slats in unison toward the opening and for selectively and independently retracting said first, second and third slats away from said opening.

6. A ground cover distribution system for distributing ground cover material comprising:

a mobile container for containing the material;

a distribution mechanism positioned at an end of said mobile container;

a mechanism within the container for moving the material contained in the container toward said distribution mechanism;

said distribution mechanism including an opening in the container at said rear end and a hose in communication with said opening for receiving material and a conveyor mechanism interposed between the opening and the hose that conveys material received from the container and directed through said opening into and through the hose to be deposited as ground cover;

an automatic control controlling the movement of the mechanism, said control having detection capability detecting the presence of material accessible for deposit into the opening and responding thereto for alternately starting and stopping the mechanism; and said mechanism removing the material being a movable floor comprising a plurality of elongated slats aligned in the direction of movement in side-by-side relationship and arranged in repeating sequence of at least first, second and third slats, said slats independently movable along the elongated length a limited distance, each of the first slats tied together, each of the second slats tied together and each of the third slats tied together and a motor for each of said first slats, second slats and third slats, and a control for selective actuation of said motors for moving the first, second and third slats in unison toward the opening and for selectively and independently retracting said first, second and third slats away from said opening.

* * * * *